US009290243B2

(12) United States Patent
Teppig, Jr.

(10) Patent No.: US 9,290,243 B2
(45) Date of Patent: Mar. 22, 2016

(54) MODULARIZED CONTAINERIZED AMPHIBIOUS VEHICLE TRANSPORT

(71) Applicant: William M. Teppig, Jr., Mt. Airy, MD (US)

(72) Inventor: William M. Teppig, Jr., Mt. Airy, MD (US)

(73) Assignee: Aeplog, Inc., Potomac, MD (US)

( * ) Notice: Subject to any disclaimer, the term of this patent is extended or adjusted under 35 U.S.C. 154(b) by 289 days.

(21) Appl. No.: 13/861,855

(22) Filed: Apr. 12, 2013

(65) Prior Publication Data

US 2014/0203534 A1 Jul. 24, 2014

Related U.S. Application Data

(60) Provisional application No. 61/623,667, filed on Apr. 13, 2012.

(51) Int. Cl.
*B60G 9/00* (2006.01)
*B63B 35/54* (2006.01)
*B60G 11/64* (2006.01)
*B63B 25/00* (2006.01)
*B63B 35/66* (2006.01)
*B63B 35/00* (2006.01)

(52) U.S. Cl.
CPC ............. *B63B 35/54* (2013.01); *B60G 11/64* (2013.01); *B63B 25/008* (2013.01); *B63B 35/00* (2013.01); *B63B 35/665* (2013.01); *B63B 2035/001* (2013.01)

(58) Field of Classification Search
USPC ........... 280/124.165; 180/116, 126, 127, 124, 180/9.1, 9.3, 9.58, 9.6; 102/402
See application file for complete search history.

(56) References Cited

U.S. PATENT DOCUMENTS

| | | | | |
|---|---|---|---|---|
| 3,823,681 A | * | 7/1974 | Cushing et al. | 114/260 |
| 3,895,596 A | | 7/1975 | Amour | |
| 5,708,230 A | * | 1/1998 | Woodall et al. | 102/402 |
| 5,722,341 A | * | 3/1998 | Tornqvist | 114/260 |
| 5,792,978 A | * | 8/1998 | Woodall et al. | 102/403 |
| 6,082,266 A | * | 7/2000 | Auzins et al. | 102/411 |
| 6,877,454 B2 | * | 4/2005 | Bowen et al. | 114/259 |
| 7,000,546 B1 | * | 2/2006 | Bender et al. | 102/402 |

(Continued)

FOREIGN PATENT DOCUMENTS

| | | |
|---|---|---|
| DE | 299 22 864 U1 | 3/2000 |
| GB | 2 189 198 A | 10/1987 |

OTHER PUBLICATIONS

International Preliminary Report on Patentability for International Application No. PCT/US2013/036370 mailed from the The International Bureau of WIPO on Oct. 23, 2014.

(Continued)

*Primary Examiner* — Toan To
(74) *Attorney, Agent, or Firm* — Brian J. Colandreo; Michael T. Abramson; Holland & Knight LLP

(57) ABSTRACT

An apparatus for a water vessel, wherein the water vessel includes at least one container configured to transport at least one vehicle, wherein the at least one container is configured to transport the at least one vehicle while the at least one container is in a body of water. The water vessel includes one or more buoyancy floats configured to maintain the at least one container afloat in the body of water. The water vessel includes a propulsion unit configured to navigate the at least one container and the at least one vehicle through the body of water.

25 Claims, 12 Drawing Sheets

(56) References Cited

U.S. PATENT DOCUMENTS

| | | |
|---|---|---|
| 7,654,211 B2 | 2/2010 | Maloney et al. |
| 7,685,955 B2 * | 3/2010 | Keck .......................... 114/77 R |
| 7,703,406 B2 * | 4/2010 | Keck et al. .................. 114/248 |
| 7,748,721 B2 | 7/2010 | Verbowski |
| 7,950,973 B2 | 5/2011 | Hewitt |
| 7,997,370 B2 * | 8/2011 | Scher et al. .................. 180/116 |
| 8,051,790 B2 * | 11/2011 | Colangelo .................... 114/258 |
| 2005/0211150 A1 * | 9/2005 | Maloney et al. .............. 114/288 |

OTHER PUBLICATIONS

International Search Report and The Written Opinion for International Application No. PCT/US2013/036370, Feb. 7, 2014, 11 pages.

* cited by examiner

MODULARIZED CONTAINERIZED AMPHIBIOUS VEHICLE TRANSPORT

RELATED CASES

This application claims the benefit of U.S. Provisional Application No. 61/623,667, filed on 13 Apr. 2012, by William Teppig Jr., entitled Modularized Containerized Amphibious Assault Vehicle (MCAAV), the contents of which are all incorporated by reference.

BACKGROUND

As defensive missile systems become more advanced, ships at least within 75 miles may be vulnerable to attack. This may be particularly applicable, for example, to ships with military capabilities that intend to place military personnel/equipment on the shore of hostile territory. Some military personnel/equipment may arrive via amphibious vehicles that are launched from the larger ships. As such, these larger ships may be required to be at least 100 to 150 miles off shore before launching the amphibious vehicles to avoid possible attack.

Some amphibious vehicles may only have a traveling range of about 25 to 50 miles, which requires the ships to come within range of the defensive missile system before launching the amphibious vehicles. Other amphibious vehicles that may have a longer range may travel slowly (e.g., around 10 knots), which results in a lengthy trip (e.g., a 10 hour trip from 100 miles out from shore). Such a trip (e.g., in a confined armored vehicle) may take a physical toll on its passengers.

BRIEF SUMMARY OF DISCLOSURE

In one implementation, an apparatus comprises a water vessel. The water vessel includes at least one container configured to transport at least one vehicle, wherein the at least one container is configured to transport the at least one vehicle while the at least one container is in a body of water. The water vessel includes one or more buoyancy floats configured to maintain the at least one container afloat in the body of water. The water vessel includes a propulsion unit configured to navigate the at least one container and the at least one vehicle through the body of water.

One or more of the following features may be included. The at least one container may be compatible with ISO standards for shipping containers. The at least one container may include an open top. The at least one container may include open ends. The at least one container may include a first container coupled to a second container. The first container may be configured to decouple from the second container. The propulsion unit may be further configured to decouple from a back portion of the at least one container. A hydrodynamic bow may be configured to streamline the water vessel until the water vessel and the at least one container plane. The hydrodynamic bow may include the hydrodynamic bow of the at least one vehicle.

In another implementation, an apparatus comprises a water vessel. The water vessel includes at least one container configured to transport one or more objects, wherein the at least one container is configured to transport one or more objects while the at least one container is in a body of water. The water vessel includes one or more buoyancy floats configured to maintain the at least one container afloat in the body of water. The water vessel includes a propulsion unit configured to navigate the at least one container and the one or more objects through the body of water.

One or more of the following features may be included. The at least one container may be compatible with ISO standards for shipping containers. The at least one container may include an open top. The at least one container may include open ends. The at least one container may include a first container coupled to a second container. The first container may be configured to decouple from the second container. The propulsion unit may be further configured to decouple from a back portion of the at least one container. A hydrodynamic bow may be configured to streamline the water vessel until the water vessel and the at least one container plane. The hydrodynamic bow may include the hydrodynamic bow of the one or more objects.

In another implementation, an apparatus comprises a vehicle. The vehicle includes, at least in part, at least one parabolic blast deflector along a bottom portion of the vehicle. The vehicle includes a vehicular propulsion unit configured to power the vehicle. The vehicle includes a platform including at least one of wheels and tracks. The vehicle includes a torsion bar suspension component and an air bag suspension component, wherein the torsion bar suspension component is configured to raise at least a portion of the platform with a lever arm upon deflation of the air bag suspension component, and wherein the air bag suspension component is configured to lower at least the portion of the platform and provide support for the vehicle.

One or more of the following features may be included. The vehicular propulsion unit may include an integrated transmission and steering system configured to drive the platform from a rear drive hub of the vehicle. The vehicle may be amphibious. The vehicle may further include a hydrodynamic bow configured to streamline a water vessel until the water vessel and at least one container carrying the vehicle plane when the vehicle is transported in a body of water. The vehicle may further include a pneumatic extender on a forward portion of the platform configured to maintain platform tension with the vehicle. The vehicle may be configured to have at least 30% in excess buoyancy when in a body of water. A weight of the vehicle may be compatible with weight restrictions compatible with ISO standards for shipping containers. The vehicle may be configured to fit within at least one container that is compatible with ISO standards for shipping containers.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
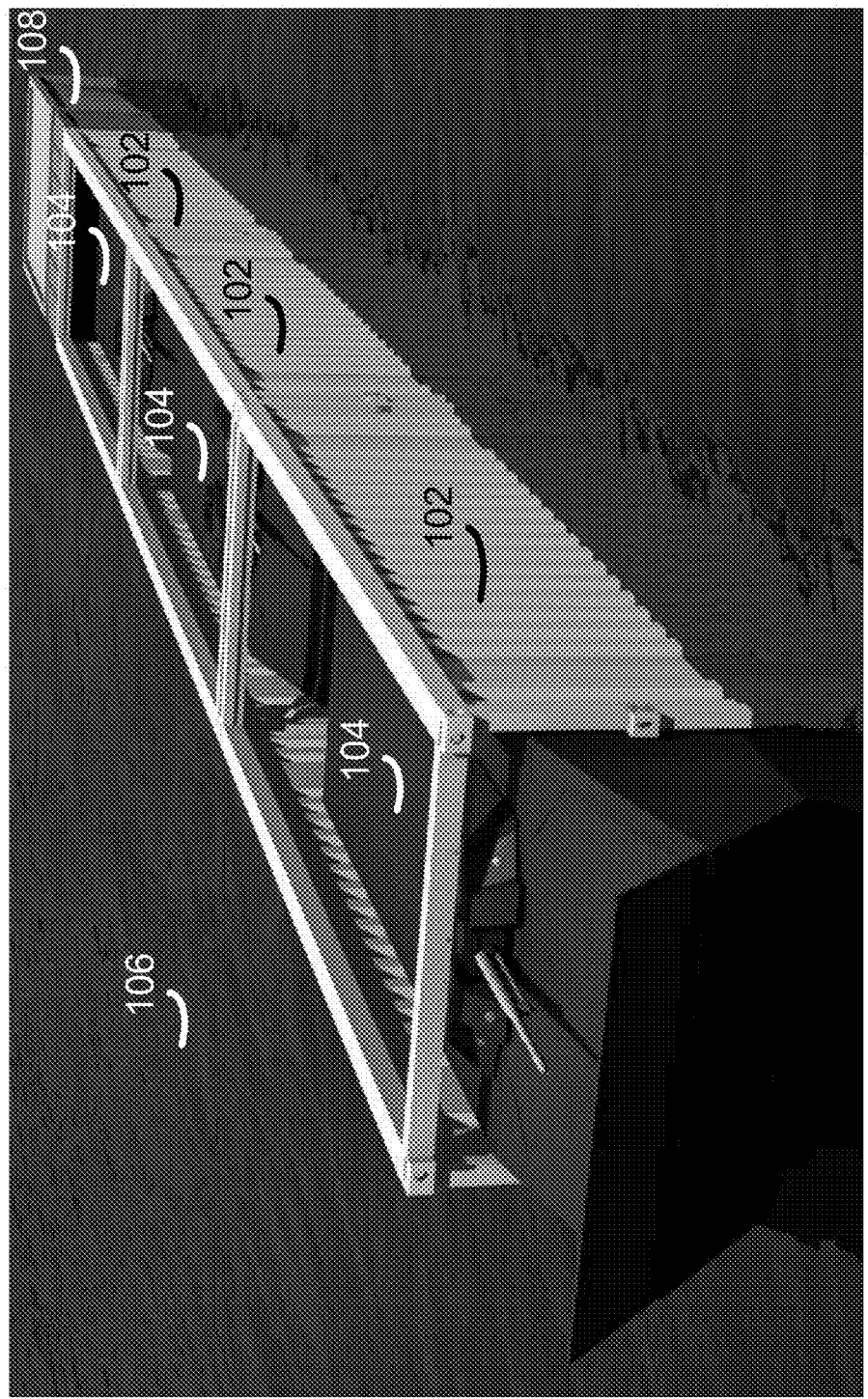
FIG. 1 is an illustrative diagrammatic view of a water vessel according to one or more implementations of the present disclosure.

As will be discussed in greater detail below, individual containers may be grouped into an ensemble (e.g., 2 to 4 units), which, along with a propulsion unit (e.g., a high powered Sea Truck Propulsion Unit) may form a 60-100 ft long vessel. These ensembles may be deployed from a ship well out to sea. In some implementations, the ensembles may consist of containers that may be specifically designed to enhance hydrodynamic efficiency and wave-riding capabilities to allow the ensemble to attain, e.g., high speeds and overcome elevated sea states with minimum power required. The internal structure of the containers may be designed to withstand, e.g., the high bending loads and torsional loads expected to be experienced during the transit to shore. The ensemble may be assembled on, e.g., a deck or within the well deck of a ship off shore from a designated landing site. The ensemble may be placed in the water via, e.g., a crane or flooding down the well deck. The ensemble may transit to the shore and beach itself, where its cargo (e.g., vehicles) may be discharged. In some implementations, the vehicles may exit the ensemble while at sea, allowing the vehicles to transit to the shore independently. In some implementations, the then empty container and Sea Truck propulsion unit ensemble may remain on the shore for the vehicles to return for transit back to the ship, or may pull back off the beach and loiter off shore (or beach at another location) for the vehicles to return.

As will be appreciated by one skilled in the art, select portions of the present disclosure (e.g., communications, sending/receiving information, vehicle and/or vessel controls/operations/functions, etc.) may be embodied as a method, system, or computer program product. Accordingly, select portions of the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, select portions of the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in any appropriate programming language, e.g., an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in, e.g., conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through, e.g., a local area network (LAN) or a wide area network (WAN), or the connection may be made to an external computer (for example, through the internet using an Internet Service Provider), or any other connection or communication techniques capable of remote interaction.

The block diagrams in the figures illustrate the architecture, functionality, and operation of possible implementations of apparatus (systems), methods and computer program products according to various implementations of select portions of the present disclosure. It will be understood that each block in the block diagrams, and combinations of blocks in the block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the block diagram blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block diagrams.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the block diagrams.

As discussed above and referring also to FIGS. 1-12, an apparatus may comprise a water vessel (e.g., vessel 100). The water vessel may include at least one container (e.g., container 102) configured to transport (e.g., one or more objects, such as at least one vehicle), wherein the at least one container may be configured to transport the at least one vehicle (e.g., vehicle 104) while the at least one container is in a body of water (e.g., water 106). The water vessel may include one or more buoyancy floats (e.g., buoyancy floats 200) configured to maintain the at least one container afloat in the body of water. The water vessel may include a propulsion unit (e.g., propulsion unit 108) configured to navigate the at least one container and the at least one vehicle through the body of water.

In some implementations, an apparatus may comprise a water vessel (e.g., vessel 100). A vessel (e.g., marine vessel) may broadly be defined as any kind of craft designed for transportation on the water. A non-limiting example vessel 100 is shown in FIG. 1. In some implementations, vessel 100 may range in length from, e.g., 60-100 feet. It will be appreciated that vessel 100 may be shorter or longer without departing from the scope of the disclosure. The water vessel may include at least one container (e.g., container 102) configured to transport one or more objects. An example object may include but is not limited to vehicle 104 (e.g., which may include an amphibious vehicle). However, it will be appreciated that any object(s) may be transported in container 102 without departing from the scope of the disclosure. In some implementations, the bottom portion of container 102 may include a dynamically configurable appendage (e.g., pseudo keel) (not shown) to, e.g., reduce wave pounding loads and enhance stability at sea. For example, appliqués (not shown) may be attached to the existing ISO compatible openings on the end blocks of containers 102, which are typically used to clamp down shipping containers to trucks, railroad cars, etc. in transport. In some implementations, the appliqués may serve as a smooth pseudo hull and may have an attached/integrated modified "V" bottom for enhanced stability and to mitigate wave pounding loads at high sea states/speeds during travel. In some implementations, the appliqués may have stepped hulls that may inject air under the hull to reduce drag. In some implementations, a tunnel hull bottom appliqué may enable spray/air to be trapped within the underside of the hull to elevate vessel 100 further out of the water and reduce drag while still providing longitudinal stability enhancements. The appliqués may provide additional internal bracing to supplement vessel 100's structure in withstanding slamming torsional loads at high speed. In some implementations, the appliqués may be added to container 102 by, e.g., lowering container 102 onto the appliqués while the appliqués are stowed in a fixture for this purpose.

In some implementations, container 102 may include "smooth" sides and bottom to reduce drag (e.g., longitudinal strakes may be used along the bottom surface to enhance controllability in addition to or in place of, for example, the above-noted pseudo keel). For example, in some implementations, while the external dimensions of container 102 may similarly or identically match those of the standard ISO shipping container to, e.g., allow seamless intermodal transport worldwide, the fabrication techniques employed in the commercial uses that may require lightweight construction to increase cargo loads may be avoided. For instance, significant drag reductions may be achieved by eliminating (or at least reducing) the corrugated side panels and the external cross bracing typically found on the underside of standard ISO shipping containers. Since flat bottom vessels may exhibit poor longitudinal stability during maneuvering at sea, longitudinal strakes or one or more short longitudinal protrusions may be included in the appliqué design to assist in maneuvering stability. Standard shipping containers may have a standard configuration and weight capability for "universal cargos"; however, in some implementations, internal tiedowns (not shown) of vehicle 104 may be optimized for ease of use, weight limitations and utilization of existing military tiedowns.

In some implementations, container 102 may include a flexible flap at the forward edge of container 102 to form a wave shield between vehicle 104 and the outer wall of container 102. This may, e.g., preclude or reduce wave entry into container 102 during water transit. In some implementations, vehicle 104 and its bow wave shield 400 (shown in FIG. 4) may occupy the vast majority of the forward opening of vessel 100. Clearance openings between vehicle 104 and the inner sides of vessel 100 may scoop water to increase the power and time required for vessel 100 to achieve a plane state (e.g., where the bow would be above the surface of the water). Buoyancy floats 200 (shown at least in FIGS. 2 and 4), may function as a flexible seal/pneumatic seal, which may reduce this scooping and reduce the power/time requirements to achieve plane. In some implementations, buoyancy floats 200, when inflated, may grip the bow and sides of vehicle 104 to "lock" or secure it inside container 102. In some implementations, vessel 100 may include attached/integrated hydrofoils for, e.g., speed and wave slamming loads.

In some implementations, container 102 may include an open top. For example, as shown at least in example FIG. 1, the top of each container 102 is completely open. In some implementations, only a portion of container 102 includes an open top (e.g., container 102 may include a partially open top). In some implementations, the top of container 102 may be removable (e.g., manually, mechanically, electronically, etc.). The open top may, in some implementations, enable easier entry and egress (e.g., of objects, people, etc.) and may enable, e.g., turret operations and firing "on the move" should such a feature be available on vehicle 104.

In some implementations, container 102 may include open ends. For example, and referring at least to FIG. 2, container 102 may include one or both open ends of the front and back. This may, e.g., allow vehicles to line up to readily enter and/or exit one or more containers 102 that may be connected together (as will be discussed in greater detail below). In some implementations, only a portion of container 102 includes an open end (e.g., container 102 may include a partially open end). In some implementations, the end(s) of container 102 may be removable (e.g., manually, mechanically, electronically, etc.).

In some implementations, container 102 may be compatible with ISO standards for shipping containers. For example, dimensions of container 102 may be similarly proportioned with those containers that are compatible with ISO standards for shipping (e.g., 20 feet long, 8 feet wide, and 8.5-9.0 feet tall). Dimensions (including example 44,000 LBS weight restrictions) other than those compatible with ISO standards for shipping may be used without departing from the scope of the disclosure. In some implementations, each vehicle 104 may fit inside a standard space claim and weight restrictions for an ISO twenty foot equivalent unit (TEU) shipping container. This may, for example, enable seamless handling, stowage (e.g., stackable), and/or shipping of vehicle 104 with readily available handling equipment worldwide.

As noted above, containers 102 may be connected together. For example, and referring at least to FIG. 3, container 102 may include a first container coupled to a second container. For instance, assume for example purposes only that container 102 includes at least two separate containers (e.g., container 102a and container 102b). In the example, container 102a may be coupled to container 102b. In some implementations, container 102a may be coupled to container 102b via one or more standard connecting portions (e.g., connecting portions 300 shown in phantom circles) of each respective container. Connecting portions 300 may be symmetrical at each end of containers 102a and 102b such that other containers may be attached to either end. In some implementations, connecting portions 300 may be located in the same locations as would be found with containers that are compatible with ISO standards for shipping as noted above. Connecting portions 300 may be situated in additional/alternative locations as needed (not shown) of containers 102a and 102b (e.g., to absorb the dynamic loading from higher speeds at sea in elevated sea states) without departing from the scope of the disclosure. As such, connecting portions 300 may be situated in any implementation that would permit the coupling of, e.g., container 102a and container 102b. In some implementations, 1-4 containers may be used to create vessel 100. It will be appreciated that while 3 containers are shown in FIG. 1, any number of containers may be used to create vessel 100 without departing from the scope of the disclosure.

In some implementations, connecting portions 300 may include, e.g., specially constructed doubled ended connectors or an integral system may be integrated into one or more ends of container 102 where containers 102 may have a "male and a female" end to allow rapid automated and/or manual coupling. In some implementations, a number of available commercial connectors may be used for coupling, such as but not limited to TANDOMLOC Horizontal Connector (12900BA-1PZ). While an example implementation of connecting portions 300 is described, other techniques for coupling container 102a and container 102b may be used without departing from the scope of the disclosure. For example, external frameworks and bridging, as well as "grabbing paw" and/or a "pineapple-shaped" twist lock may be used.

In some implementations, the first container may be configured to decouple from the second container. For example, container 102a may be readily decoupled (e.g., disengaged) from container 102b manually by, e.g., initiating explosive bolts for release, energizing hydraulic actuators causing the connectors to release, and/or by physically unbolting the manual connectors in units such as used in the above-noted TANDOMLOC Horizontal Connector (12900BA-1PZ) manual coupling. In some implementations, container 102a may be readily decoupled from container 102b using, e.g., explosive bolts, which may be detonated remotely. For instance, the explosive bolts may use, e.g., a hardwired or RF signal, to energize the uncoupling. Example techniques to achieve this may include but are not limited to, e.g., the use of segmented bolts and gas generators driving them apart, cutting charges, etc. "Readily" decoupled may generally be described as the ability to quickly and/or easily decouple two or more containers without the need for heavy equipment (e.g., fork lifts, cranes, etc.). The ability to quickly decouple two or more containers may enable such a decoupling while the containers are in body of water 106, as well as on a dry surface, to, e.g., allow emergency egress of vehicle 104. For instance, container 102b (and/or the vehicle being transported by container 102b) may be damaged. In the example scenario, container 102b may be decoupled from the other containers, where the remaining undamaged containers may be re-coupled.

In some implementations, container 102 may be configured to transport vehicle(s) 104 while container 102 is in a body of water (e.g., water 106). For example, and referring again to FIG. 1, vessel 100 is shown to include three different containers 102. In some implementations, a single container 102 may be sized as two or more containers. As can be seen in FIG. 1, containers 102 of vessel 100 are (e.g., at least partially submerged) in water 106 (e.g., lake, ocean, bay, etc.) during the transportation of vehicle 104 within containers 102.

Figure 2:
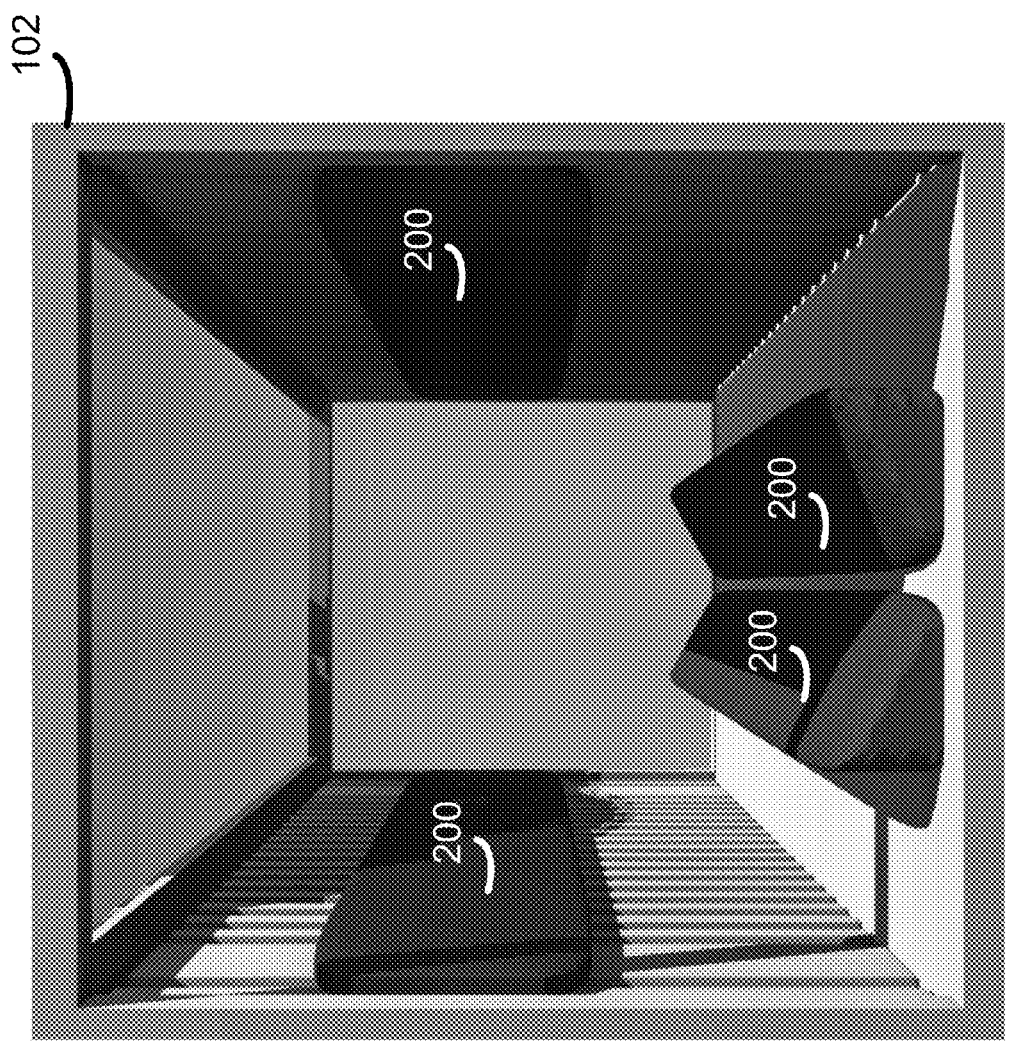
FIG. 2 is an illustrative diagrammatic view of a container of the water vessel according to one or more implementations of the present disclosure.
Figure 3:
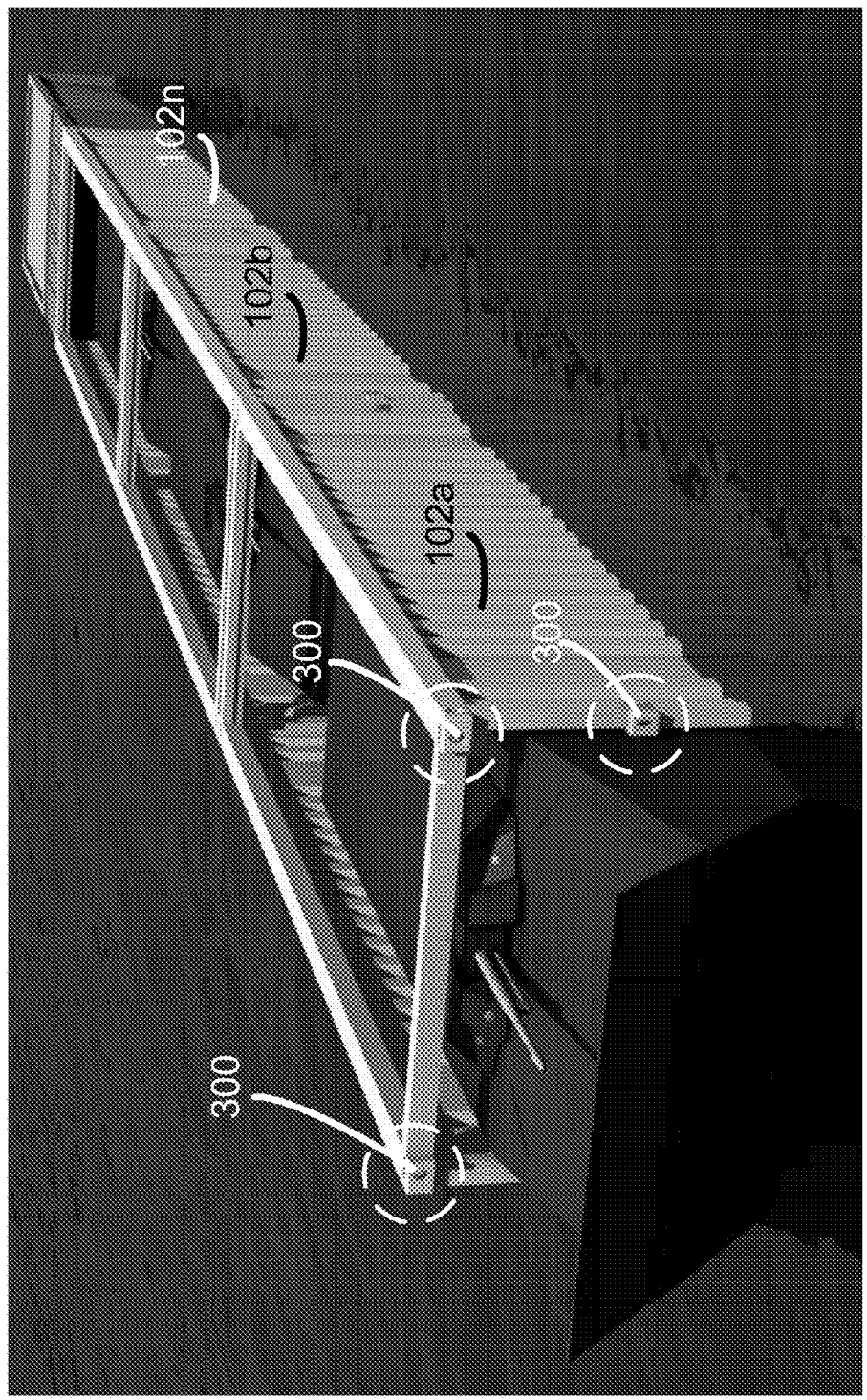
FIG. 3 is an illustrative diagrammatic view of a water vessel according to one or more implementations of the present disclosure.
Figure 4:
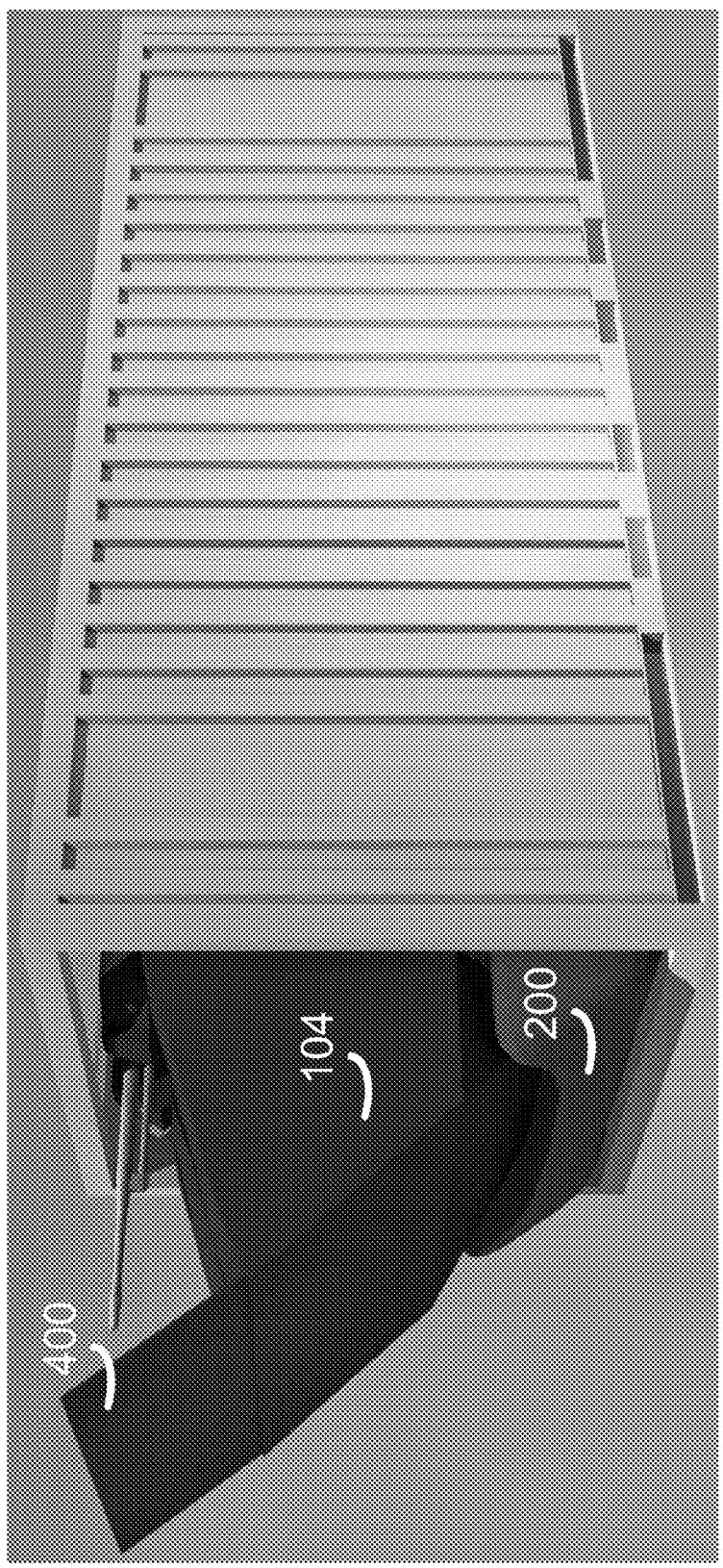
FIG. 4 is an illustrative diagrammatic view of a vehicle within the container of the water vessel according to one or more implementations of the present disclosure.
Figure 5:
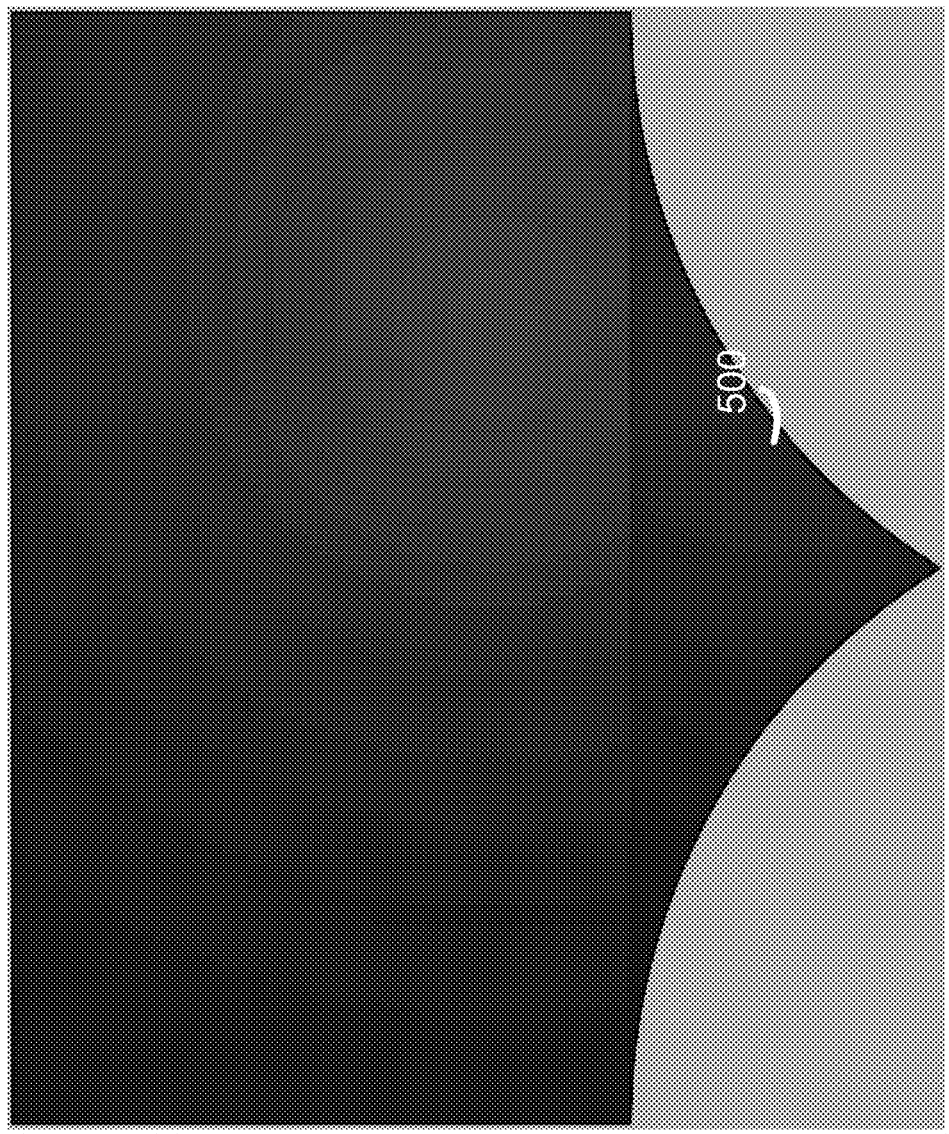
FIG. 5 is an illustrative diagrammatic view of a parabolic blast deflector of a vehicle according to one or more implementations of the present disclosure.
Figure 6:
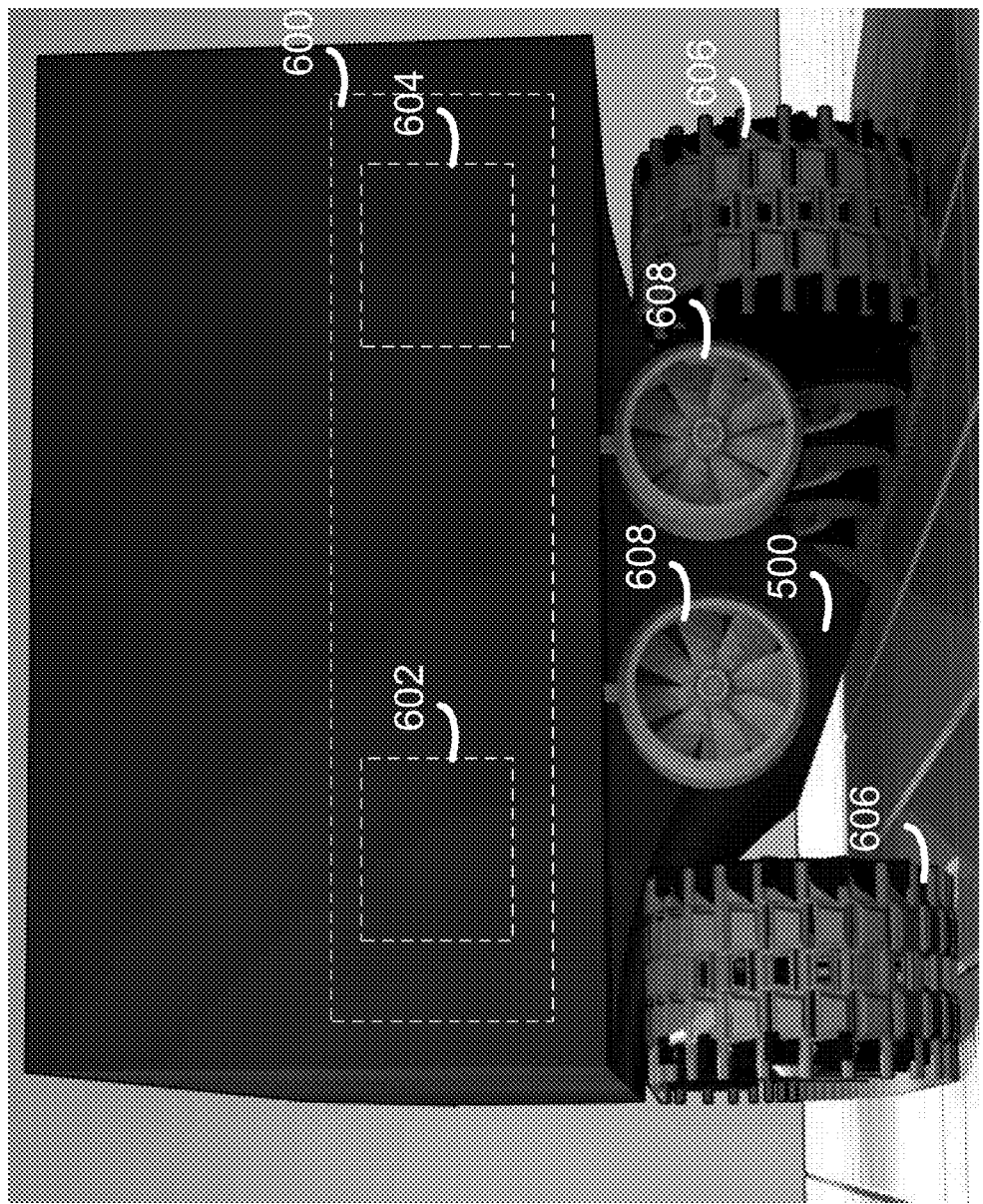
FIG. 6 is an illustrative diagrammatic view of a vehicle according to one or more implementations of the present disclosure.
Figure 7:
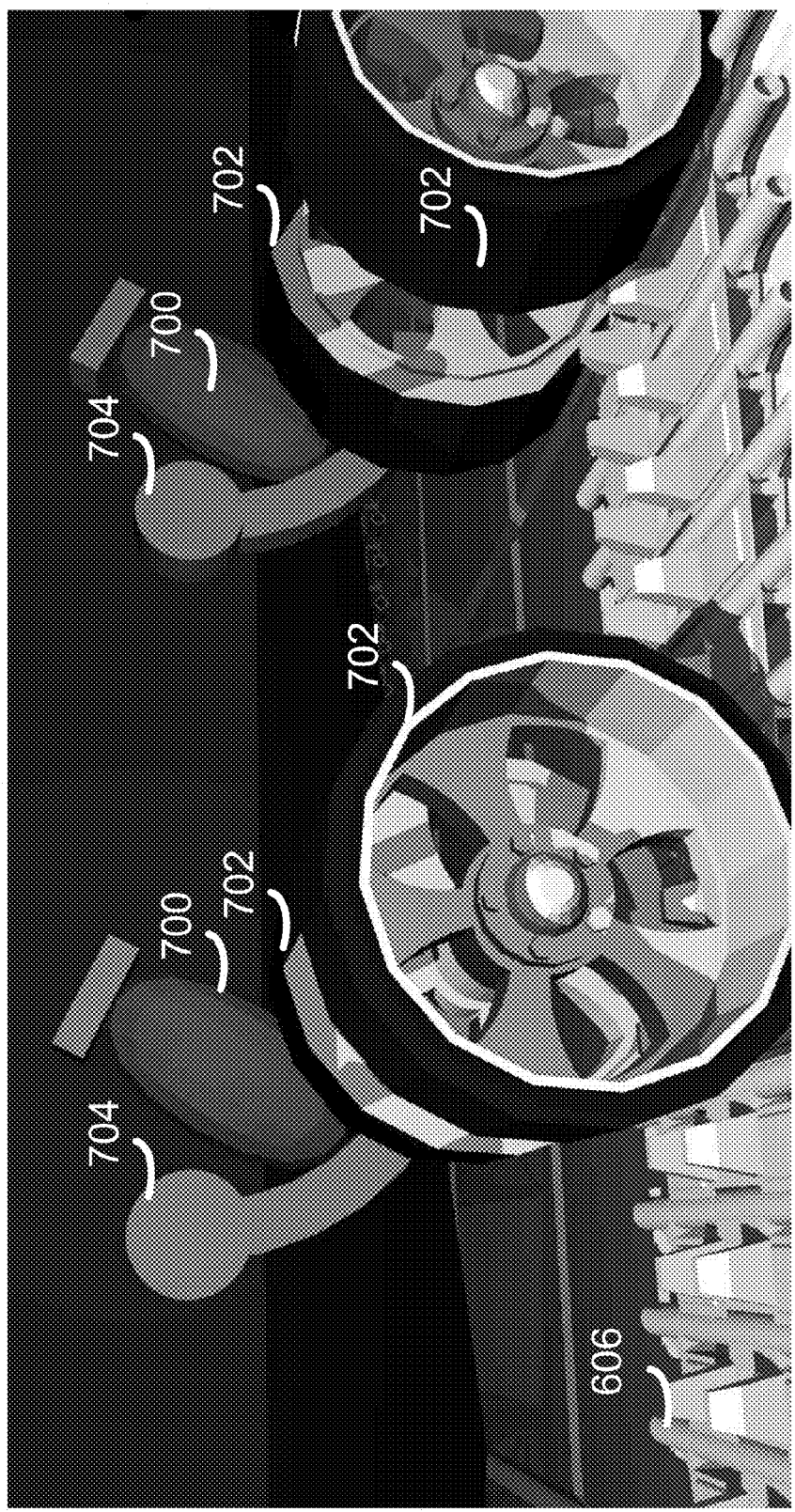
FIG. 7 is an illustrative diagrammatic view of a vehicle suspension component according to one or more implementations of the present disclosure.

In some implementations, and referring at least to FIG. 2, vessel 100 may include one or more buoyancy floats (e.g., buoyancy floats 200) configured to maintain container 102 afloat in water 106. In the example, buoyancy floats 200 are positioned on both inside walls of container 102, as well as on the bottom portion of container 102. In some implementations, buoyancy floats 200 may be positioned at additional/alternative portions of container 102 to maintain container 102 afloat in water 106, such as the outside walls of container 102, or underneath container 102. Buoyancy floats 200 may be secured to container 102 using any fastening techniques, such as but not limited to adhesives, bolts, and/or internal tracks that capture a "lip" on buoyancy float 200. As noted above, buoyancy floats 200 may also be used to restrain vehicle 104 to container 102. For example, buoyancy floats 200 may be lighter than water (e.g., when inflated) and may squeeze against the hull of container 102 and vehicle 104 to restrain it. In some implementations, buoyancy floats 200 may be very robust and may be made of, e.g., Kevlar type aramid to allow flexibility as well as puncture resistance, robust plastic similar to that used in maritime bumpers for vessels, synthethic reinforced rubber similar to that used in automotive tires, etc. Other examples of buoyancy floats 200 may also be used without departing from the scope of the disclosure. For example, portions of container 102 (e.g., the walls) may be filled with air pockets. As another example, foam inserts may be secured to/in the sides of container 102 to allow it to float. Without the dual floatation/restraint function of the example buoyancy floats 200, a separate restraint system for restraining the vehicles in the container may be used. In some implementations, buoyancy floats 200 may enable at least one container 102 to remain afloat after vehicle 104 departs from container 102 and may provide a navigable vessel from the now empty container 102 and propulsion section (discussed further below).

In some implementations, vessel 100 may include a propulsion unit (e.g., propulsion unit 108) configured to navigate container 102 and vehicle(s) 104 through water 106. For example, and referring again to FIGS. 1 and 3, water vessel 100 may include propulsion unit 108. Propulsion unit 108 may include, for example, one or more partially/fully submerged pump jets/propulsors. Other examples of propulsion unit 108 may be used without departing from the scope of the disclosure. For example, submerged propellers may also be used as well as above the surface propellers/jet/rockets. In some implementations, propulsion unit 108 may be coupled to container 102 similarly as would container 102a be coupled to container 102b as discussed above. For instance, propulsion unit 108 may include the same (or similar) connecting portions 300 as the above-noted container(s) to enable propulsion unit 108 to couple to any of the above-noted containers. Similarly, propulsion unit 108 may be further configured to decouple from a back portion of one of the above-noted containers as previously discussed. In some implementations, propulsion unit 108 may provide sufficient thrust (e.g., via pump jet/propulsors) to enable vessel 100 to plane. In some implementations, propulsion unit 108 may include sufficient fuel at least to provide a travel radius of at least 50 miles. In some implementations, an ISO sized fuel insert may be used for extended operations/refueling units ashore.

In some implementations, propulsion unit 108 (and thus at least a portion of vessel 100) may be enabled to be autonomously controlled, remotely controlled by one or more of vehicles 104, and/or remotely controlled by another station via ship, ashore, satellites, hand held devices, air, etc. A navigation control override may be communicated to propulsion unit 108 diverting it from its original programmed course to a new course, or active manual control may be ordered via the same communication methods allowing one of the drivers within vehicle 104 aboard to "steer' the vessel. Multiple vessels 100 may be "redirected" via a similar communication command to respond to changing conditions.

In some implementations, a hydrodynamic bow may be configured to streamline the water vessel until the water vessel and the at least one container plane. The hydrodynamic bow may be directly or indirectly coupled to an open (front) end of container 102. In some implementations, the hydrodynamic bow may be deflated and during exit or return, vehicle 104 may run over the hydrodynamic bow. The hydrodynamic bow may be manually, mechanically, and/or electrically raised, lowered, extended, retracted, etc. In some implementations, at least a portion of bow 400 may be a disposable insert that mimics buoyancy float 200 (e.g., shown in FIG. 4). For example, use of a disposable bow may be used where, e.g., a pneumatic version is less practical or a high wear item.

In some implementations, the hydrodynamic bow may include the hydrodynamic bow of the at least one vehicle. For example, and referring at least to FIG. 4, the hydrodynamic bow (e.g., bow 400) may be directly and/or indirectly coupled to, e.g., vehicle 104. Bow 400 may be manually, mechanically, and/or electrically raised, lowered, extended, retractable, etc. In the example, the forward most vehicle 104 may protrude from the forward most container 102 to utilize at least a portion of buoyancy float 200 (e.g., its wave flap), which may be a pneumatic structure, and bow 400 design to streamline the entire vessel 100 until it planes during sea travel. In some implementations, the hydrodynamic bow may be discarded upon the vehicle's exit from the container.

As discussed above and referring also to FIGS. 1-12, an apparatus may comprise a vehicle (e.g., vehicle 104). Vehicle 104 may include, at least in part, at least one parabolic blast deflector along a bottom portion of vehicle 104. Vehicle 104 may include a vehicular propulsion unit configured to power vehicle 104. Vehicle 104 may include a platform including at least one of wheels and tracks. Vehicle 104 may include a torsion bar suspension component and an air bag suspension component, wherein the torsion bar suspension component may be configured to raise at least a portion of the platform with a lever arm upon deflation of the air bag suspension component, and wherein the air bag suspension component may be configured to lower at least the portion of the platform and provide support for vehicle 104.

An example of vehicle 104 may include, e.g., a Modular Containerized Amphibious Assault Vehicle (MCAAV). As noted above, vehicle 104 may include other vehicle types without departing from the scope of the disclosure. As will be discussed in greater detail below, and as noted above, vehicle 104 (e.g., the MCAAV) may in some implementations be amphibious and may be an amphibious assault vehicle designed to be launched at sea from, e.g., an over-the-horizon ship, beach autonomously, and traverse cross country, up to, e.g., 150 miles inland, while transporting a tactical unit (e.g., reinforced rifle squad or other personnel). For example, vehicle(s) 104 in conjunction with the above-noted vessel may include the capability of delivering, e.g., 17 members of a reinforced rifle squad, to the beach and beyond. Vehicle 104 may be equipped with such items that may include but are not limited to, e.g., C4ISR, NBC protection, mine blast protection, and armor.

In some implementations, the design of vehicle 104 may enable amphibious capabilities of traveling at, e.g., 40-50+ knots to a beach when being transported by vessel 100, e.g., 6-12 knots beaching and river crossing after discharge from vessel 100, and, e.g., 6-12 knots returning from the beach. In some implementations, the design of vehicle 104 when being transported by vessel 100 may enable (e.g., without refueling), e.g., 100 miles to the beach, e.g., then after discharge from vessel 100 transiting 150 miles inland without refueling, e.g., 25 miles at-sea (for each single vehicle), and a speed on land of e.g., 50-80 mph. It will be appreciated that the above-noted speeds and distances are examples and should not be taken to limit the scope of the disclosure.

In some implementations, vehicle 104 may include, at least in part, at least one parabolic blast deflector along a bottom portion of vehicle 104. Adequate blast deflection (e.g., to resist the blast pressures and to soften the vertical acceleration from an explosion) may be achieved by a tailored "curved" or parabolic deflector. For example, vehicle 104 may include a parabolic blast deflector (e.g., parabolic blast deflector 500) along the bottom of the manned section of vehicle 104. In some implementations, this may optimize the available space (e.g., by freeing up design space under vehicle 104) for a wider track system or wheels while still providing adequate blast deflection protection for the crew e.g., a 10 pound mine as required by NATO and allow a sufficiently wide track to meet low ground pressure requirements to traverse, e.g., soft sand/mud, etc.

In some implementations, the shape of the hull appliqué may be dynamically changed, e.g., to optimize its performance in differing seas. This may be accomplished, e.g., using pneumatic chambers that may be pressurized to deform the outer surface, and changing its streamline characteristics. In some implementations, hydraulic and/or mechanical screws may be used to push or pull panels to increase or decrease the depth of the "V" on the bottom of the appliqué hull.

In some implementations, vehicle 104 may include a vehicular propulsion unit configured to power vehicle 104. For instance, and referring at least to FIG. 6, an alternative example view of vehicle 104 is shown. In the example, vehicle 104 may include a vehicular propulsion unit (e.g., vehicular propulsion unit 600). In some implementations, vehicular propulsion unit 600 may include an integrated transmission (e.g., integrated transmission system 602) and steering system (e.g., integrated steering system 604) configured to drive the platform from a rear drive hub of vehicle 104. In some implementations, vehicular propulsion unit 600 may be a single unit that may reduce combat repair time in the field and at the depot, which may increase combat availability. Vehicular propulsion unit 600 may be drive by wire and include a power pack steering unit on the outside of the crew compartment. This may, e.g., reduce the volume that must be protected by armor, reduce weight, reduce the fire/toxic hazards to the crew since such material is on the outside, reduce the complexity thereby increasing survivability, and reduce probabilities of hostile fire impacts as vehicular propulsion unit 600 may be below an example one meter level.

In some implementations, vehicle 104 may include a platform including at least one of, e.g., wheels (not shown) and tracks (e.g., tracks 606). Tracks 606 may, for example, include the operational capability of being deployed at, e.g., 8-9 psi ground pressure). In some implementations, a wheeled version of vehicle 104 may include, e.g., an electric motor within one or more wheel hubs or hydraulic motors within one or more wheel hubs. These may be powered from the "power pack" generator or hydraulic pump, for example.

In some implementations, vehicular propulsion unit 600 may include a diesel/diesel hybrid. Currently, the more efficient engines utilizing the available universal heavy fuel may be, e.g., a diesel engine. Increased efficiencies resulting in enhanced power levels per pound and extended ranges may be optimized through the use of, e.g., turbocharging. Further enhancements in efficiency may be attained in a hybrid configuration by pairing the primary power plant with onboard batteries/capacitors coupled with integral electric motor/generators or pairing the primary power plant with kenetic energy storage systems (e.g., flywheels or pneumatic accumulator(s)) and a mechanical linkage to assist the drivetrain.

In some implementations, the diesel/diesel hybrid may enable easy replacement of the "power pack". For example, by disconnecting two or three hoses and about six bolts, the entire engine, transmission and controls may be lifted out of the back of the vessel 100 and/or vehicle 104 as a single unit (power pack) and replaced within, e.g., one hour. In some implementations, the diesel/diesel hybrid may enable bow up longitudinal pitch due to the weight bias over having all of the major weight components situated in the extreme aft part of vehicle 104. For example, the overall weight components of vehicle 104 may be fairly uniform (e.g., only the engine/transmission and the main gun mount may be "moveable" in example designs). Placing the heaviest in the back may make the front float higher.

In some implementations, the diesel/diesel hybrid may enable the elimination of some or all hydraulic lines going through the personnel compartment. For example, "drive by wire" designs may eliminate the need for hydraulic lines for steering, and a pneumatic suspension may eliminate other hydraulic lines. The personnel compartment may broadly be described as the armored hull that surrounds the seated personnel. Generally, below the roof, inside the hull and above the parabolic deflector is the personnel compartment. The "power pack" may be located, e.g., behind the armored rear section of the personnel compartment. In some implementations, some or all forward appendages and the turret may be electrically powered.

In some implementations, the diesel/diesel hybrid may enable better space utilization and a reduction in the amount of armor required. The engine compartment and turret will be unarmored. In some implementations, armor may weigh about 25 to 45 pounds per square foot depending on the threat levels it must resist. The amount of armor may be driven by the volume and shape of the space it must protect. The suspension system and the power plant may support and drive the weight. Each extra pound may require additional fuel, which adds more weight. In some implementations, vehicle 104 may be designed such that armor protection is restricted to those areas protecting the personnel within vehicle 104, which may depend upon such things as, e.g., tactical considerations and the threat level. In some implementations, this armor reduction may reduce the overall weight of vehicle 104 without compromising the safety of the personnel.

The use of a diesel/diesel hybrid should be taken as an example only and not to limit the scope of the disclosure, as other engine/motor implementations may also be used. For example, alternate power plants may run the full range of exotic systems such as but not limited to sterling engines, fuel cells, advanced electric batteries, miniature nuclear powered steam units, etc. Example considerations when selecting the power plant may include, e.g., horsepower, weight pace claim volume, and range.

As noted above, vehicle 104 may be amphibious. When being powered in a body of water, vehicular propulsion unit 600 may be operatively connected to, e.g., a notational propulsion system that may include one or more propulsors, such as propulsors 608. Vehicular propulsion unit 600 may be operatively connected to other devices, such as a pump jet, without departing from the scope of the disclosure. As such, any description of propulsors should be taken as an example only and not to otherwise limit the scope of the disclosure.

In some implementations, vehicle 104 may be configured to have at least 30% in excess buoyancy when in a body of water (e.g., water 106). For instance, vehicle 104 may be configured to have at least 30% in excess buoyancy when vehicle 104 is "free swimming". For instance, 30% excess buoyancy may generally be described as when vehicle 104 is floating in the water and 30% of the hull may be above water. For example, the top hatch(es) may be high enough to allow emergency egress from vehicle 104 in heavy seas before vehicle 104 is swamped. Adding air bags to vehicle 104 outside may enable the 30% example excess buoyancy, but may add complexity and cost. In some implementations, a weight budget for the expected vehicle volume may be established to achieve the excess buoyancy with the design.

In some implementations, and as described above referring again at least to FIG. 4, vehicle 104 may further include a hydrodynamic bow (e.g., bow 400) that may be configured to streamline a water vessel (e.g., vessel 100) until vessel 100 and at least one container carrying vehicle 104 (e.g., container 102) plane when vehicle 104 is transported in water 106 (e.g., during sea travel). In some implementations, bow 400 may be manually, mechanically, and/or electrically raised, lowered, extended, retracted, etc. In some implementations, bow 400 may be directly and/or indirectly coupled to vehicle 104.

In some implementations, vehicle 104 may include a torsion bar suspension component and an air bag suspension component. For instance, and referring at least to FIG. 7, vehicle 104 may include a suspension component (e.g., a pneumatic torsion bar suspension component). In some implementations, a lever arm (e.g., lever arm 704) may attach to the torsion bar(s), which may run transverse (e.g., perpendicular to the centerline of vehicle 104) and may be anchored near the centerline of vehicle 104. Pneumatic torsion bar suspension component may be a light weight torsion bar suspension component that may be configured to raise at least a portion of the platform (e.g., track rollers 702 and track 606) with a lever arm (e.g., lever arm 704) upon deflation of the air bag suspension component (e.g., airbag suspension component 700). For example, lever arm 704 may be preloaded to rotate, e.g., counter clockwise, when the air is released in air bag suspension component 700, thus raising track rollers 702.

Air bag suspension component 700 may be configured to lower at least the portion of the platform (e.g., track rollers 702 and track 606) and provide support for vehicle 104. For example, airbag suspension component 700 may overpower torsion bar suspension component/lever arm 704 to lower track rollers 702 and support vehicle 104. For instance, as pressure is increased to overcome the torsion bar lift, lever arm 704 may be rotated, e.g., clockwise, lowering track rollers 702 and lifting vehicle 104. This may be individually raised or lowered by a manifold controlling the individual airbags 700.

Figure 8:
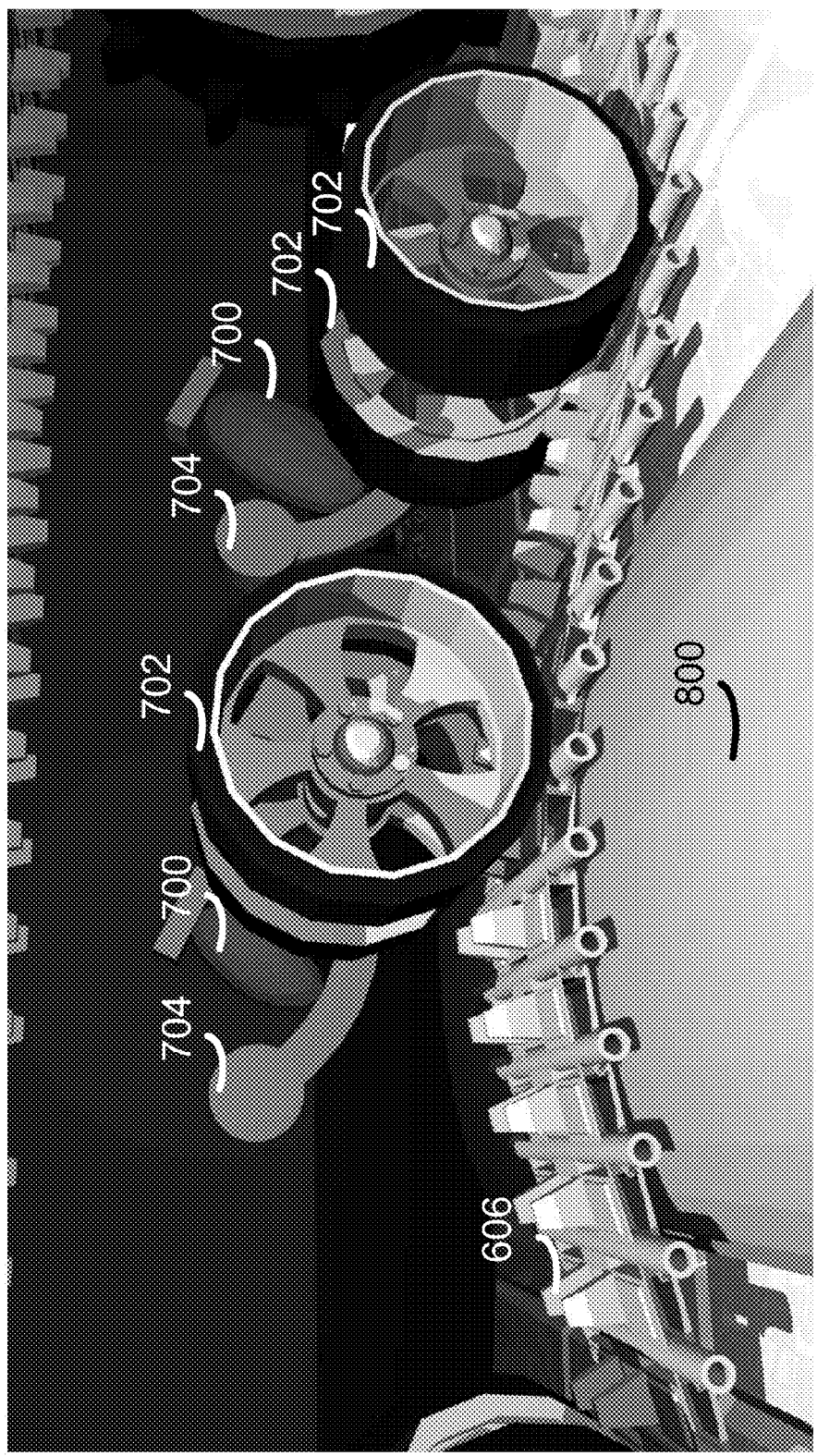
FIG. 8 is an alternative illustrative diagrammatic view of a vehicle suspension component according to one or more implementations of the present disclosure.

An example of the track/wheel platform of vehicle 104 moving over an obstacle (e.g., obstacle 800) is shown in FIG. 8. In some implementations, as can be seen at least from FIG. 8, the suspension system may be adaptable and compliant to ride over obstacles. Each component may be free to operate independently while transiting the terrain. The overall ride height/ground clearance may be adjusted as a system by, e.g., adjusting the air pressure in the air bag suspension components 700. In some implementations, this may be used as a way to lower vehicle 104 while inside container 102 to reduce the height for shipping.

In some implementations, vehicle 104 may further include a pneumatic extender on a forward portion of the platform configured to maintain platform tension with vehicle 104. For example, a pneumatic extender may be located on, e.g., the forward wheels to maintain track tension when the suspension is "folded" for, e.g., stowage or transport in container 102. For instance, in some tracked vehicles, there may be a change of "tension" on the track depending on its overall height. This maybe aggravated when extreme changes in ride height occur, where a track tensioner (and/or pneumatic track tension extender) may be added to keep the track from "jumping" off the vehicle, e.g., when "folded" for shipping. Depending on the final geometry of the suspension system, this component may not be required.

In some implementations, and as discussed above, vehicle 104 may be configured to fit within at least one container that is compatible with ISO standards for shipping containers. For example, and referring again at least to FIG. 1, dimensions of container 102 may be similarly proportioned with those containers that are compatible with ISO standards for shipping (e.g., 20 feet long, 8 feet wide, and 8.5-9.0 feet tall). Dimensions other than those compatible with ISO standards for shipping may be used without departing from the scope of the disclosure. In some implementations, each vehicle 104 may fit inside a standard space claim and weight restrictions for an ISO twenty foot equivalent unit (TEU) shipping container. This may, for example, enable seamless handling, stowage (e.g., stackable), and/or shipping of vehicle 104 with readily available handling equipment worldwide. As the size of container 102 increases or decreases, it will be appreciated that design specification for vehicle 104 to fit within the increased/decreased sized container may altered accordingly (and vice versa) without departing from the scope of the disclosure.

In some implementations, a weight of vehicle 104 may be compatible with weight restrictions compatible with ISO standards for shipping containers. For example, the design of vehicle 104 may be such that it may be limited to a maximum weight to fall within the maximum weight limit of, e.g., 44,000 LBS, e.g., for a twenty-foot equivalent unit (TEU). As the size of the container increases or decreases, it will be appreciated that the maximum weight of vehicle 104 may be increased or decreased respectively without departing from the scope of the disclosure.

Figure 9:
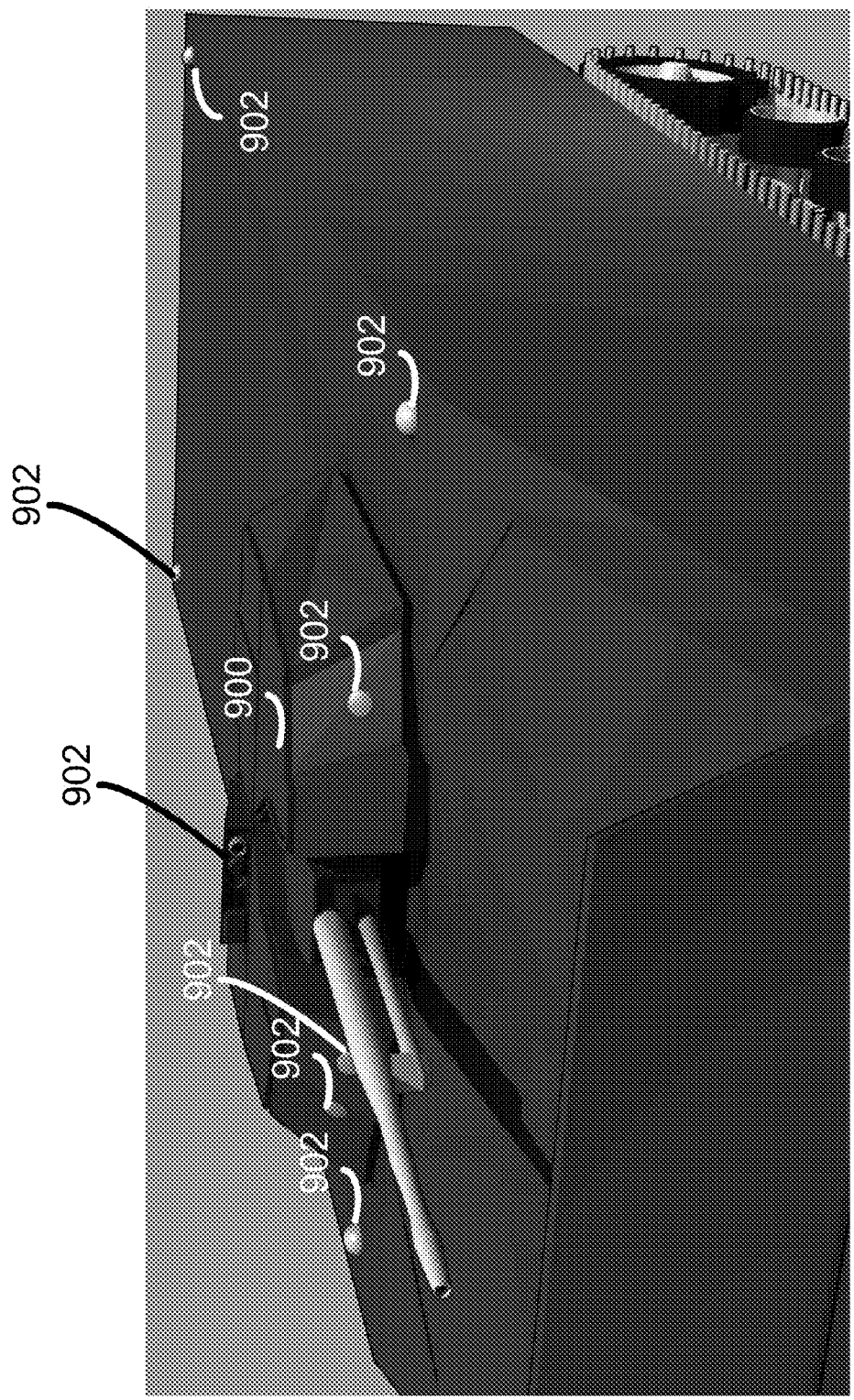
FIG. 9 is an alternative illustrative diagrammatic view of a vehicle according to one or more implementations of the present disclosure.

In some implementations, and referring at least to FIG. 9, vehicle 104 may include a turret (e.g., turret 900) that may be remotely operated and controlled by the forward facing gunner whom may be placed, e.g., center in the rear of vehicle 104. In some implementations, vehicle 104 may include one or more cameras, such as multi-spectrum cameras 902 that may enable overlapping fields of view. In some implementations, the multi-spectrum cameras may provide a synthetic 3-D image to the gunner and the driver with the capability of digital magnification and low light, IR/UV detection. For instance, the US Army Stryker vehicle may include a synthesized image provided to the driver and gunner from multiple cameras/sensors. In some implementations, intelligence data may be superimposed on those images. Each individual camera may be optimized for its desired spectrum, and some may be optimized for more than one. The outputs from the sensors may be merged and a computer enhanced image may be provided to the operator. Additionally, off-board data such as intelligence status, weather, anticipated positions of friendly and foe forces may be digitally injected into the synthethic image provided to the driver, gunner and other passengers. In some implementations, some sensors may be stacked, e.g., one behind the other, depending on the frequencies of each sensor layer.

Figure 10:
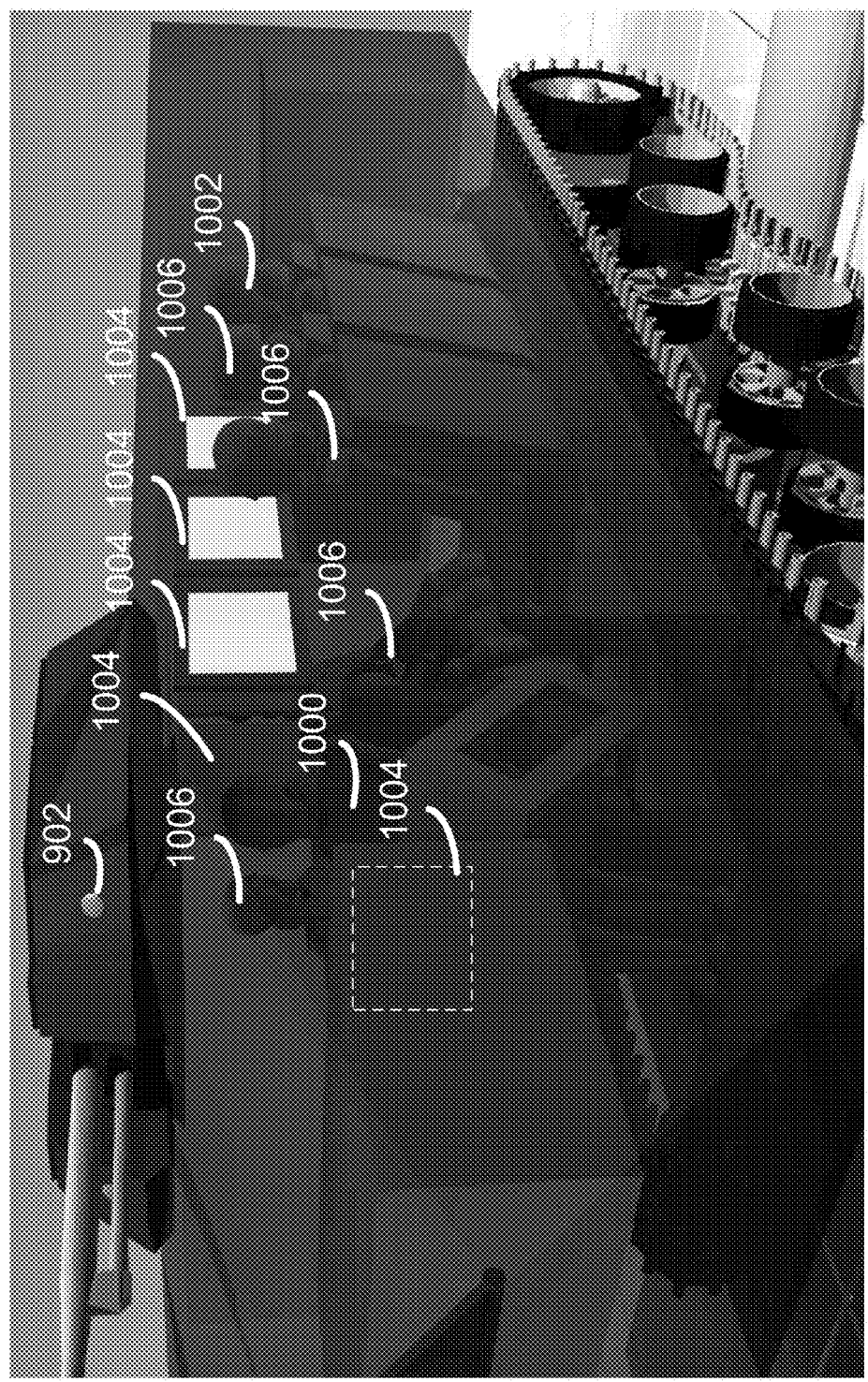
FIG. 10 is an alternative illustrative diagrammatic view of a vehicle according to one or more implementations of the present disclosure.

In some implementations, and referring at least to FIG. 10, vehicle 104 may enable driver 1000 and gunner 1002 to control their field of view (e.g., from one or more of multi-spectrum cameras 902) separately (e.g., via display 1004). The same field of view capability similarly may be provided to each of the passengers as well. In the example, vehicle 104 may provide space for, e.g., 6 to 8 passengers seated facing inboard above tracks 606. For instance, the 6-8 passengers may include driver 1000, gunner 1002, and 4-6 passengers (not labeled). In some implementations, vehicle 104 may include additional emergency space for at least 3 additional personnel/equipment. The emergency space may enable the remaining 2 vehicles (e.g., in an example three vehicle ensemble as shown in FIG. 1) to transport an entire reinforced rifle squad of, e.g., 17, in an emergency situation.

In some implementations, the communication design may allow intra-vehicle communication within the above-noted ensemble allowing all passengers or tactical unit members to have face to face coordination capability within the "team", as well as full tactical communication with other vehicle ensembles and higher commands.

Figure 11:
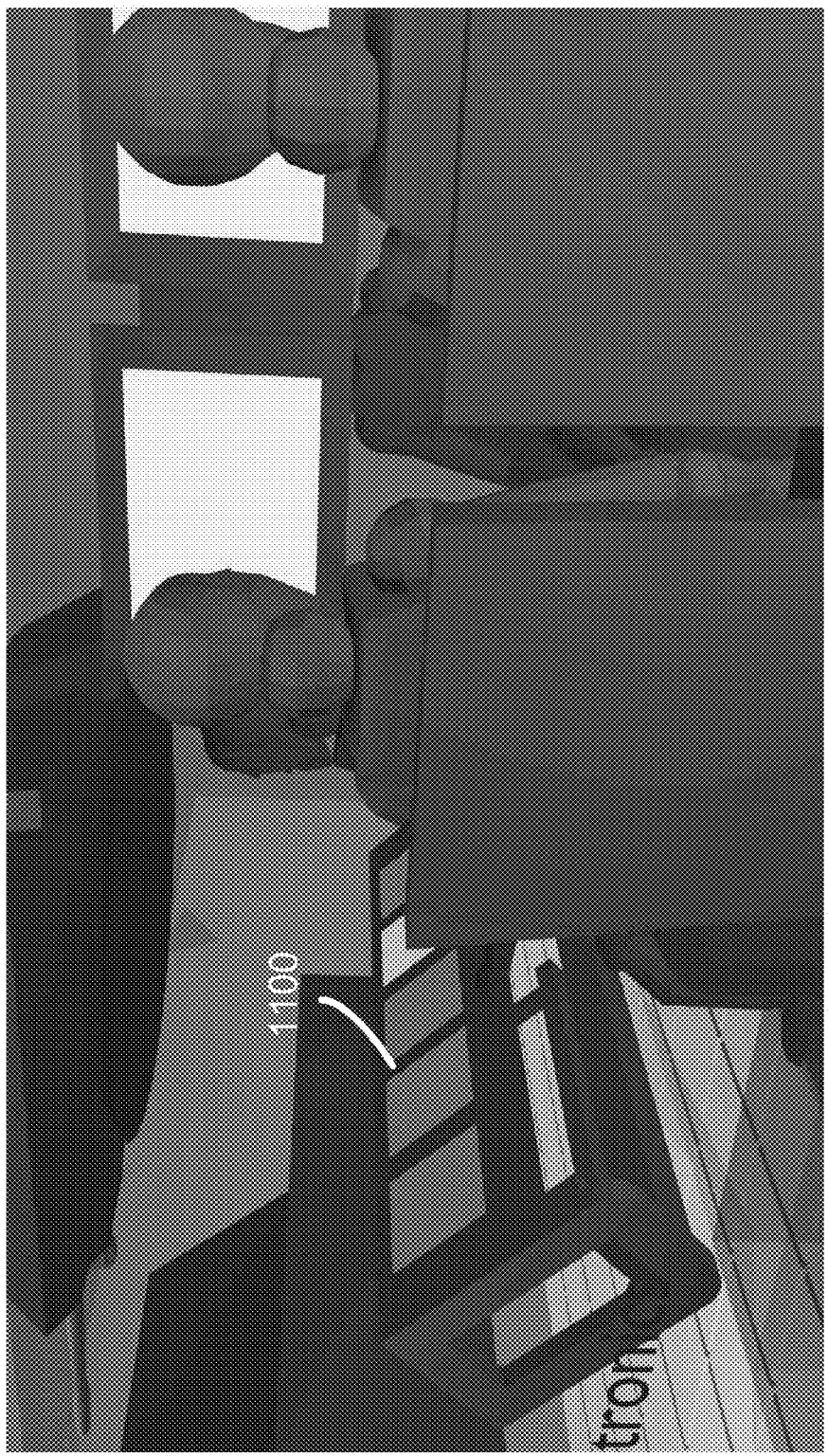
FIG. 11 is an alternative illustrative diagrammatic view of a vehicle according to one or more implementations of the present disclosure.
Figure 12:
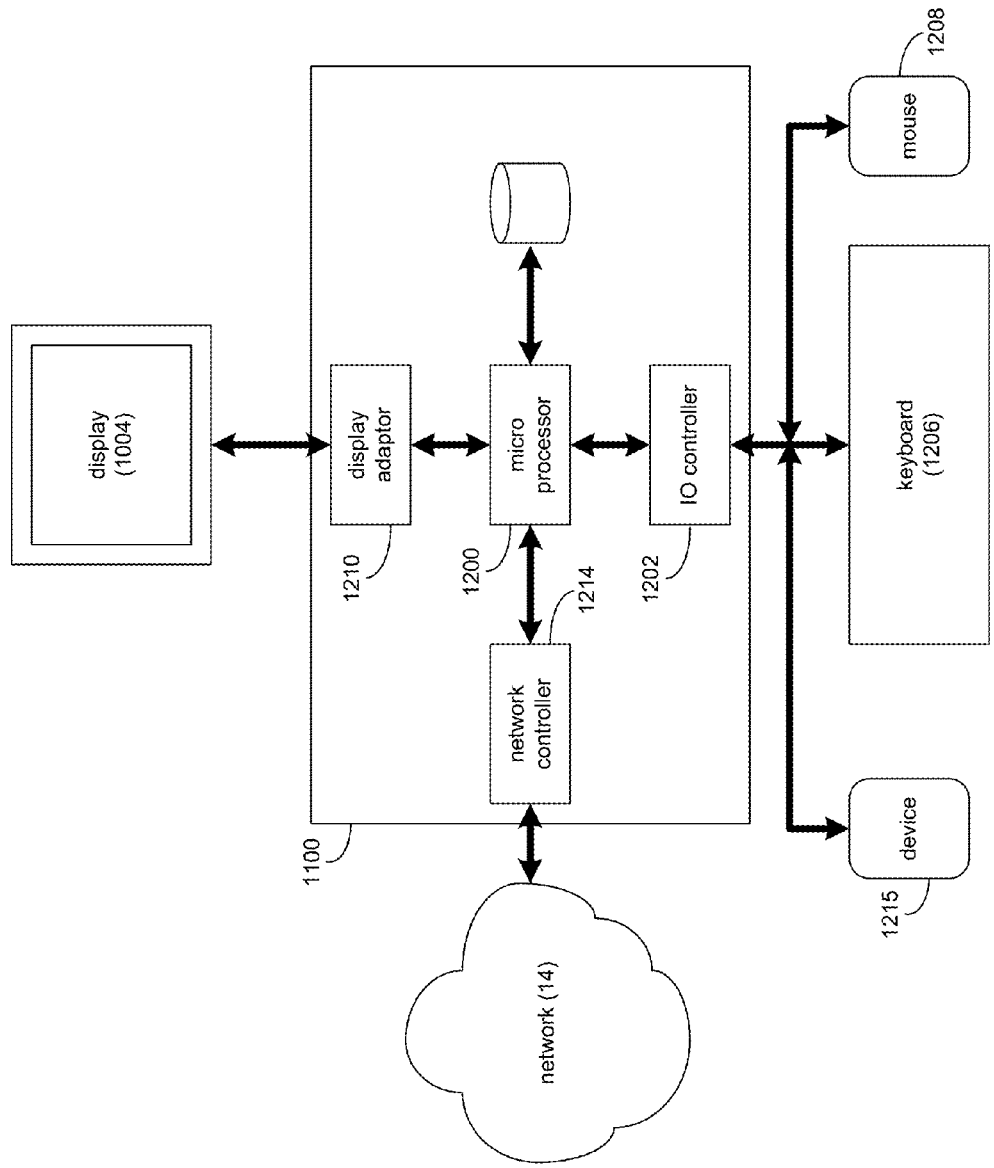
FIG. 12 is a diagrammatic view of a computer according to one or more implementations of the present disclosure.

In some implementations, and referring at least to FIG. 11, the communications, sending/receiving of information, vehicle and/or vessel controls/operations/functions, etc. of vehicle 104 and/or vessel 100 may be computer assisted (e.g., via computer 1100) and simplified to allow for vehicle 104 and/or vessel 100 to be "crewed" by, e.g., the members of a tactical unit (e.g., reinforced rifle squad or other personnel). For example, and referring also to FIG. 12, there is shown a diagrammatic view of computer 1100. While computer 1100 is shown in this figure, this is for illustrative purposes only and is not intended to be a limitation of this disclosure, as other configurations are possible. For example, any computing device capable of executing, in whole or in part, any of the described implementations of vehicle 104 and/or vessel 100 may be substituted for computer 1100 within FIG. 12.

Client electronic device 38 may include a processor and/or microprocessor (e.g., microprocessor 1200) configured to, e.g., process data and execute the above-noted code/instruction sets and subroutines. Microprocessor 1200 may be coupled via a storage adaptor (not shown) to the above-noted storage device. An I/O controller (e.g., I/O controller 1202) may be configured to couple microprocessor 1200 with various devices, such as keyboard 1206, pointing/selecting device (e.g., mouse 1208), custom device (e.g., device 1215), USB ports (not shown), and printer ports (not shown). A display adaptor (e.g., display adaptor 1210) may be configured to couple display 1004 (e.g., CRT or LCD monitor(s)) with microprocessor 1200, while network controller/adaptor 1214 (e.g., an Ethernet adaptor) may be configured to couple microprocessor 1200 to the above-noted network 14 (e.g., the Internet or a local area network).

In some implementations, situational awareness, targeting and firing may be completed remotely. In some implementations, since the vehicle is drive by wire and fire by wire, the same sensor information provided to the driver and the gunner may be transmitted to external units as well. This may open the possibility of a fully remote controlled vehicle completing tactical operations in the example event that the crew is disabled or absent from the vehicle.

Since each passenger within vehicle 104 may be provided with a video interface panel to coordinate tactics based on synthesized external situational geography and communicate with other members within the unit, the same system may be used to conduct "organic" training in preparation for operations. The latest intelligence information and topographic information may be received at computer 1100 and integrated into, e.g., current weather conditions, to allow the assault team to practice their coordinated tactics, as a unit, as they approached the objective.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. An apparatus comprising:
a water vessel, wherein the water vessel includes,
at least one container configured to transport at least one vehicle, wherein the at least one container is configured to transport the at least one vehicle while the at least one container is in a body of water;
one or more buoyancy floats configured to maintain the at least one container afloat in the body of water; and
a propulsion unit configured to navigate the at least one container and the at least one vehicle through the body of water, wherein the vehicle includes a pneumatic extender on a forward portion of a platform configured to maintain platform tension with the vehicle.

2. The apparatus of claim 1 wherein the at least one container is compatible with ISO standards for shipping containers.

3. The apparatus of claim 1 wherein the at least one container includes a first container coupled to a second container.

4. The apparatus of claim 3 wherein the first container is configured to decouple from the second container.

5. The apparatus of claim 1 wherein the propulsion unit is further configured to decouple from a back portion of the at least one container.

6. The apparatus of claim 1 further comprising a hydrodynamic bow configured to streamline the water vessel until the water vessel and the at least one container plane.

7. The apparatus of claim 6 wherein the hydrodynamic bow includes the hydrodynamic bow of the at least one vehicle.

8. The apparatus of claim 1 wherein the at least one container includes an open top.

9. The apparatus of claim 1 wherein the at least one container includes open ends.

10. An apparatus comprising:
a water vessel, wherein the water vessel includes,
at least one container configured to transport one or more objects, wherein the at least one container is configured to transport the one or more objects while the at least one container is in a body of water;
one or more buoyancy floats configured to maintain the at least one container afloat in the body of water; and
a propulsion unit configured to navigate the at least one container and the one or more objects through the body of water, wherein the one or more objects includes a vehicle with a pneumatic extender on a forward portion of a platform configured to maintain platform tension with the vehicle.

11. The apparatus of claim 10 wherein the at least one container is compatible with ISO standards for shipping containers.

12. The apparatus of claim 10 wherein the at least one container includes a first container coupled to a second container.

13. The apparatus of claim 12 wherein the first container is configured to decouple from the second container.

14. The apparatus of claim 10 wherein the propulsion unit is further configured to decouple from a back portion of the at least one container.

15. The apparatus of claim 10 further comprising a hydrodynamic bow configured to streamline the water vessel until the water vessel and the at least one container plane.

16. The apparatus of claim 15 wherein the hydrodynamic bow includes the hydrodynamic bow of the one or more objects.

17. The apparatus of claim 10 wherein the at least one container includes an open top.

18. The apparatus of claim 10 wherein the at least one container includes open ends.

19. An apparatus comprising:
a vehicle, wherein the vehicle includes, at least in part,
   at least one parabolic blast deflector along a bottom portion of the vehicle,
   a vehicular propulsion unit configured to power the vehicle,
   a platform including at least one of wheels and tracks,
   a torsion bar suspension component and an air bag suspension component, wherein the torsion bar suspension component is configured to raise at least a portion of the platform with a lever arm upon deflation of the air bag suspension component, and
   wherein the air bag suspension component is configured to lower at least the portion of the platform and provide support for the vehicle, wherein the vehicle includes a pneumatic extender on a forward portion of the platform configured to maintain platform tension with the vehicle.

20. The apparatus of claim 19 wherein the vehicular propulsion unit includes an integrated transmission and steering system configured to drive the platform from a rear drive hub of the vehicle.

21. The apparatus of claim 19 wherein the vehicle is amphibious.

22. The apparatus of claim 21 wherein the vehicle further includes a hydrodynamic bow configured to streamline a water vessel until the water vessel and at least one container carrying the vehicle plane when the vehicle is transported in a body of water.

23. The apparatus of claim 21 wherein the vehicle is configured to have at least 30% in excess buoyancy when in a body of water.

24. The apparatus of claim 19 wherein a weight of the vehicle is compatible with weight restrictions compatible with ISO standards for shipping containers.

25. The apparatus of claim 19 wherein the vehicle is configured to fit within at least one container that is compatible with ISO standards for shipping containers.

* * * * *